United States Patent [19]

Scalzo et al.

[11] Patent Number: 4,850,196

[45] Date of Patent: Jul. 25, 1989

[54] FUEL NOZZLE ASSEMBLY FOR A GAS TURBINE ENGINE

[75] Inventors: Augustine J. Scalzo, Bensalem, Pa.; Leslie G. Kish, Greenville, Tex.

[73] Assignee: Westinghouse Electric Corp., Pittsburgh, Pa.

[21] Appl. No.: 111,891

[22] Filed: Oct. 13, 1987

[51] Int. Cl.⁴ .................................... F02C 7/22

[52] U.S. Cl. .................................... 60/740; 60/39.32

[58] Field of Search .................... 60/39.32, 740, 737, 60/738, 748

[56] References Cited

U.S. PATENT DOCUMENTS 3,911,672 10/1975 Irwin .................... 60/39.32
4,154,056 5/1979 Emory .................... 60/39.32
4,258,544 3/1981 Gebhart et al. .................... 60/39.32
4,409,791 10/1983 Jourdain et al. .................... 60/39.32
4,513,569 4/1985 Sasaki et al. .................... 60/39.32

*Primary Examiner*—Louis J. Casaregola
*Assistant Examiner*—Timothy S. Thorpe
*Attorney, Agent, or Firm*—K. Bach

[57] ABSTRACT

A fuel nozzle assembly having a cylindrical nozzle tip at one end of a fuel delivery tube and a supporting flange at the other end. An air delivery tube, also secured to said support flange, encloses the fuel delivery tube to define an annular air chamber therebetween. A cylindrical face of the nozzle tip is received in an similarly sized and shaped opening in a swirl cap attached to the end of the fuel delivery tube to slideably engage the air delivery tube and the fuel delivery tube and to define a substantially constant radial spaced relationship between the cylindrical nozzle tip and the air delivery tube during variable axial expansion of the fuel delivery tube and air delivery tube. The air delivery tube is secured to the fuel delivery tube by mounting a radially expansive portion of the air delivery tube to the support flange.

16 Claims, 3 Drawing Sheets

FUEL NOZZLE ASSEMBLY FOR A GAS TURBINE ENGINE

RELATED APPLICATIONS

This application is related to U.S. patent application Ser. No. 111,892, now abandoned and U.S patent application Ser. No. 111,890.

BACKGROUND OF THE INVENTION

1. Field of the Invention

This invention relates to a fuel nozzle assembly for a gas turbine engine, and more specifically, to such a fuel nozzle assembly for a gas turbine engine having a fuel tube and an air tube enclosing the fuel tube to define an annular air passage therebetween, the air tube and fuel tube being slideably engaged to prevent contamination of the air passage. The fuel nozzle assembly is constructed such that the air passage is readily accessible for cleaning.

2. Description of the Prior Art

A typical fuel nozzle assembly capable of separately delivering both air and fuel to a combustion chamber generally comprises a fuel delivery tube supported from one end and having a fuel nozzle tip with a conical surface secured to the other, and an air delivery tube, also supported by the same one end, the air delivery tube enclosing the fuel delivery tube in a spaced relationship to define therebetween an annular air flow channel. A swirl cap is threaded onto the free end of the air delivery tube and tightened so that a conical opening in the swirl cap sealingly engages the conical surface of the nozzle tip. The swirl cap is further provided with a plurality of small apertures equilangularly spaced around the center of the swirl cap for directing atomizing air from the air flow channel in a direction convergent to the fuel which exits the fuel nozzle tip in an outwardly diverging conical pattern.

As the air delivered through the assembly is primarily used only at ignition of the gas turbine engine to atomize the fuel, it is important to provide an atomizing air pattern which is predictable and delivers an atomized fuel-air mixture generally adjacent to either a flame cross-over tube or a spark ignitor, or both.

The fuel nozzle tip injects fuel in an outwardly diverging, generally conical, pattern. However, during low fuel flow, fuel pressure atomization is poor and air is introduced through the swirl cap to further atomize the fuel injected by nozzle. In such a manner, the conical pattern is altered to result in a nodular or 4-spoke spray pattern. This additional atomizing air is necessary during light-off ignition to provide greater atomization of the fuel as it is introduced through the nozzle to reduce unburned fuel emissions and to obtain better distribution of the air fuel mixture to insure that it is properly delivered to the turbine to propagate the combustion process in the turbine. After light-off ignition is complete, the atomization air is cut off and fuel only is delivered through the nozzle to continue the combustion process.

To ensure that the air flow atomizes the fuel stream to the nodular spray pattern desired during atomization, the air flow is channeled through apertures having the same geometric orientation as the opening in the fuel nozzle tip through which the fuel is directed. However, providing the fuel spray and air spray with similar flow characteristics has proved unnecessary to achieve the desired nodular spray pattern of the atomized fuel spray.

Conical surfaces are utilized in such prior art devices because the conical seal, once established, was thought to provide the best air-tight seal available. To make the conical seal a high quality, air-tight seal, however, it was necessary to apply a fine grinding paste to the conical nozzle tip prior to engaging the nozzle tip with the swirl cap. Further, and more seriously, the conical nozzle tip and swirl cap utilized in achieving such a sealing interface lead to the formation of gaps at the fuel nozzle/swirl cap interface during axial expansion of the air delivery tube. This causes severe deterioration in the ability of the fuel nozzle assembly to provide the desired atomized fuel spray characteristics. In addition, such gaps encourage the formation of contaminants which further deteriorate the performance of the fuel nozzle assembly. The prior art devices are also prone to the accumulation of deposits in the air delivery channel which tends to clog it and do not provide access to the air delivery channel for removing such deposits. One such prior art fuel nozzle having a conical engagement between the swirl cap and the fuel delivery tube is disclosed in U.S Pat. No. 4,154,056 entitled "Fuel Nozzle Assembly for a Gas Turbine Engine", issued May 15, 1979 and assigned to the assignee of the present invention.

The problems identified in the prior art devices may be traced to the fact that the temperature of the fuel flowing through the fuel delivery tube is generally about 100° Fahrenheit. The temperature of the air in the space between the tubes, however, may reach 600° Fahrenheit. Such a temperature difference between the fuel tube and the air tube often causes varied axial expansion of the fuel tube and air tube, resulting in a disengagement of the conical seal between the fuel nozzle tip and the air delivery tube, thus creating the above-mentioned gap at the sealing interface between the two. This gap provides an area where contaminants from the air flowing therethrough or carbon deposits caused by occasional reverse flow from the combustor, can accumulate to prevent the gap from resealing. The air tube itself may also become clogged with contaminants. During shutdowns, the conical seal interface may be contaminated by fuel oil from the nozzle tip.

As such, any gap between the air tube and the fuel nozzle tip provides an air leakage path that deleteriously affects the atomizing air distribution such that an unpredictable fuel-air pattern can exist which produces erratic and unpredictable light-off characteristics. If contamination of the air passage is severe enough, the flow of atomizing air may be completely cut off, preventing light-offs.

Further, once the fuel nozzle assembly of the known prior art is assembled and mounted in a combustion chamber of a gas turbine engine, it becomes extremely difficult to mechanically clean the air delivery channel and remove the contaminants which may be causing either leakage at the sealing interface or blockage of the air delivery pipe.

SUMMARY OF THE INVENTION

It is an object of this invention to provide a fuel nozzle assembly for a gas turbine engine which maintains a constant sealing interface between the fuel nozzle tip and the swirl cap during axial expansion of the air delivery tube.

Another object of this invention is to provide a fuel nozzle assembly wherein the fuel nozzle tip/swirl cap interface prevents the accumulation of carbon deposits at the fuel nozzle tip/swirl cap interfaced during axial expansion of the air delivery tube.

Yet another object of this invention is to provide a fuel nozzle assembly for a gas turbine engine or the like, wherein contamination of the air delivery tube is minimized.

Still yet another object of this invention is to provide an air-tight sealing interface between the fuel nozzle tip and the swirl cap without applying grinding pastes to the nozzle tip.

Another object of this invention is to provide a fuel nozzle assembly in which the air delivery tube is readily detachable from the assembly so that the air channel is accessible for cleaning.

These and other objects and advantages are achieved by the present invention which provides a fuel nozzle assembly for a gas turbine engine. The nozzle assembly is comprised of a fuel delivery tube substantially enclosed by an air delivery tube. The fuel delivery tube has a cylindrically shaped nozzle attached to its discharge end. The air delivery tube, which substantially encloses the fuel delivery tube to define an air passage between the two, has a swirl cap attached to its discharge end. The nozzle of the fuel tube is received in a similar cylindrically shaped opening in the swirl cap so that the fuel tube slideably engages the air tube. To provide a nozzle assembly in which the atomizing air passage is readily accessible for cleaning and in which the fuel tube and air tube are secured together, the air delivery tube is attached at the support flange to align and secure the fuel delivery tube with the air delivery tube. Since the nozzle is slideably engaged with the swirl cap, when there is varied axial expansion of the air tube and fuel tube caused by an extreme temperature differential between the air and the fuel flowing through their respective tubes, the spaced relationship between the air tube and the fuel tube is maintained and the phenomena of gapping at the nozzle/swirl cap interface observed in the prior art does not occur.

BRIEF DESCRIPTION OF THE DRAWINGS

The invention may be better understood and further advantages and uses thereof are readily apparent, when considered in view of the following detailed description of exemplary embodiments, taken with the accompanying drawing in which.

DESCRIPTION OF THE PREFERRED EMBODIMENT

Figure 1B:
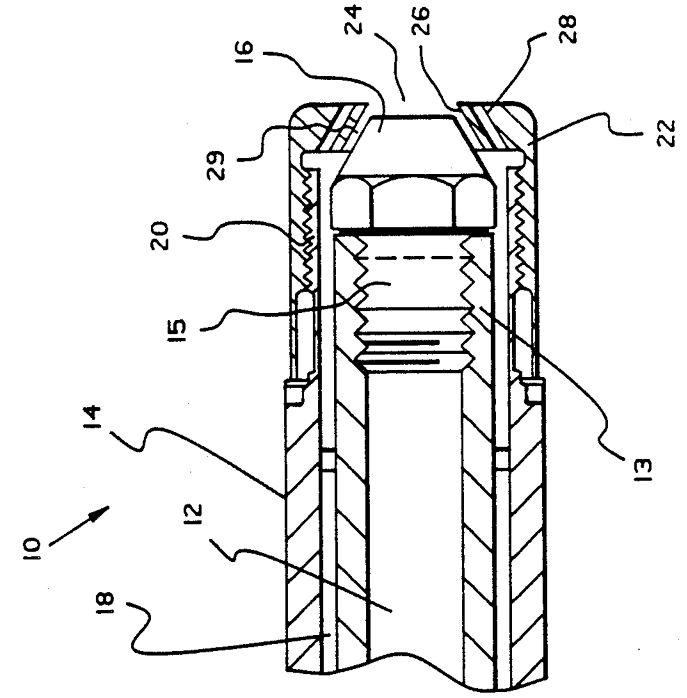
FIG. 1b. PRIOR ART
FIG. 1*b* is an axial cross-sectional view similar to FIG. 1*a* of the delivery end of the prior art fuel nozzle assembly which has undergone axial expansion caused by severe high temperature operating conditions.
Figure 1A:
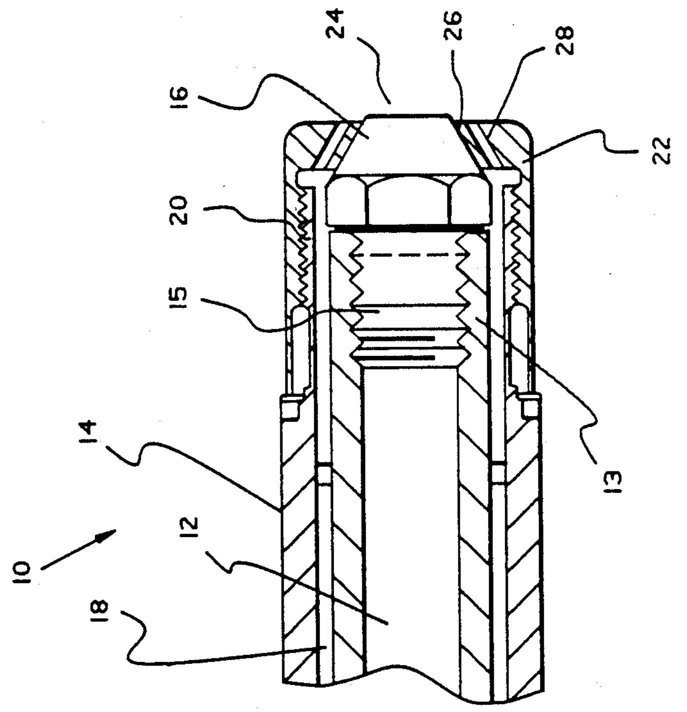
FIG. 1a. PRIOR ART
FIG. 1*a* is an axial cross-sectional view of the delivery end of a typical prior art fuel nozzle assembly under normal operating conditions.

Referring first to FIGS. 1*a* and 1*b*, the end of the nozzle assembly 10 of a typical prior art fuel nozzle assembly is shown. The nozzle assembly 10 includes an inner fuel delivery tube 12 and a surrounding outer air delivery tube 14. The air delivery tube 14 is concentric and substantially coextensive with the fuel delivery tube 12. The fuel delivery tube 12 has a delivery end 13 which includes an axial opening in which a fuel nozzle tip 15 is threaded onto the fuel delivery tube 12. The fuel nozzle tip 15 includes a conical face 16 for engaging the air delivery tube 14. The air delivery tube 14 extends axially with, and concentric to, the fuel delivery tube 12 to define an annular air passage 18 between the outer wall of fuel delivery tube 12 and the inner wall of air delivery tube 14 throughout their common axial extent. The end 20 of air delivery tube 14 has a reduced outer diameter threaded for receipt of a swirl cap 22.

The swirl cap 22 includes a centrally located opening 24. The central opening 24 is shaped to define a tapered conical surface 26. The swirl cap further includes small apertures 28 equilangularly spaced around the swirl cap 22 for directing atomizing air in a predetermined convergent direction to intercept and atomize the fuel exiting fuel nozzle tip 15. The tapered conical surface is sized to conform to the taper of the conical face 16 of fuel nozzle tip 15 so that as swirl cap 22 is tightened onto air delivery tube 14, the nozzle tip 15 projects into the opening 24 and, when properly tightened, provides a sealed engagement between the conical face 16 and surface 26.

FIG. 1*a* shows the nozzle assembly 10 of the prior art when subjected to normal temperature conditions, i.e. when there is no extreme temperature differential between the fuel flowing in the fuel delivery tube 12 and the air flowing in the air delivery tube 14. As clearly shown in FIG. 1*a*, when there is no temperature differential between the tubes, the fuel and air delivery tubes are sealed at the nozzle tip 15/conical surface 26 interface. No gapping is present at the interface, and contamination of the air passage 18 is unlikely. The air atomization of the fuel spray generally results in the desired atomized nodular spray pattern.

Turning to FIG. 1*b*, the fuel nozzle assembly 10 is shown when subject to axial expansion of the air delivery tube caused by the extreme thermal conditions during operation. During normal engine operation, combustion air from the compressor surrounds the air delivery tube 14 and has a temperature of approximately 600° to 700° F. The fuel, however, generally has a temperature of about 100° F., holding the fuel delivery tube 12 to a much lower temperature than that of the air delivery tube 14. This causes the air delivery tube to axially expand to a greater extent than the axial expansion of the fuel tube, and results in a gap 29 between the conical tip 16 and the inner surface 26. Typically, the gap 29 between the conical tip 16 and the inner surface 26 may extend as much as 0.030 inches. Because of contaminants in the air flow or the occasional reverse flow of combustion products into this gap, particles build up or become lodged in gap 29, which buildup prevents the gap from closing when the extreme temperature differential of the tubes is removed following completion of the turbine ignition. Thus, prior to a subsequent ignition of the turbine, the gap would already be present even without a temperature differential between the tubes.

The air leakage through this gap deleteriously alters the discharge of the atomizing air flow, changing the atomization spray pattern of the fuel nozzle assembly and thereby altering the light-off response of the combustor.

Figure 2:
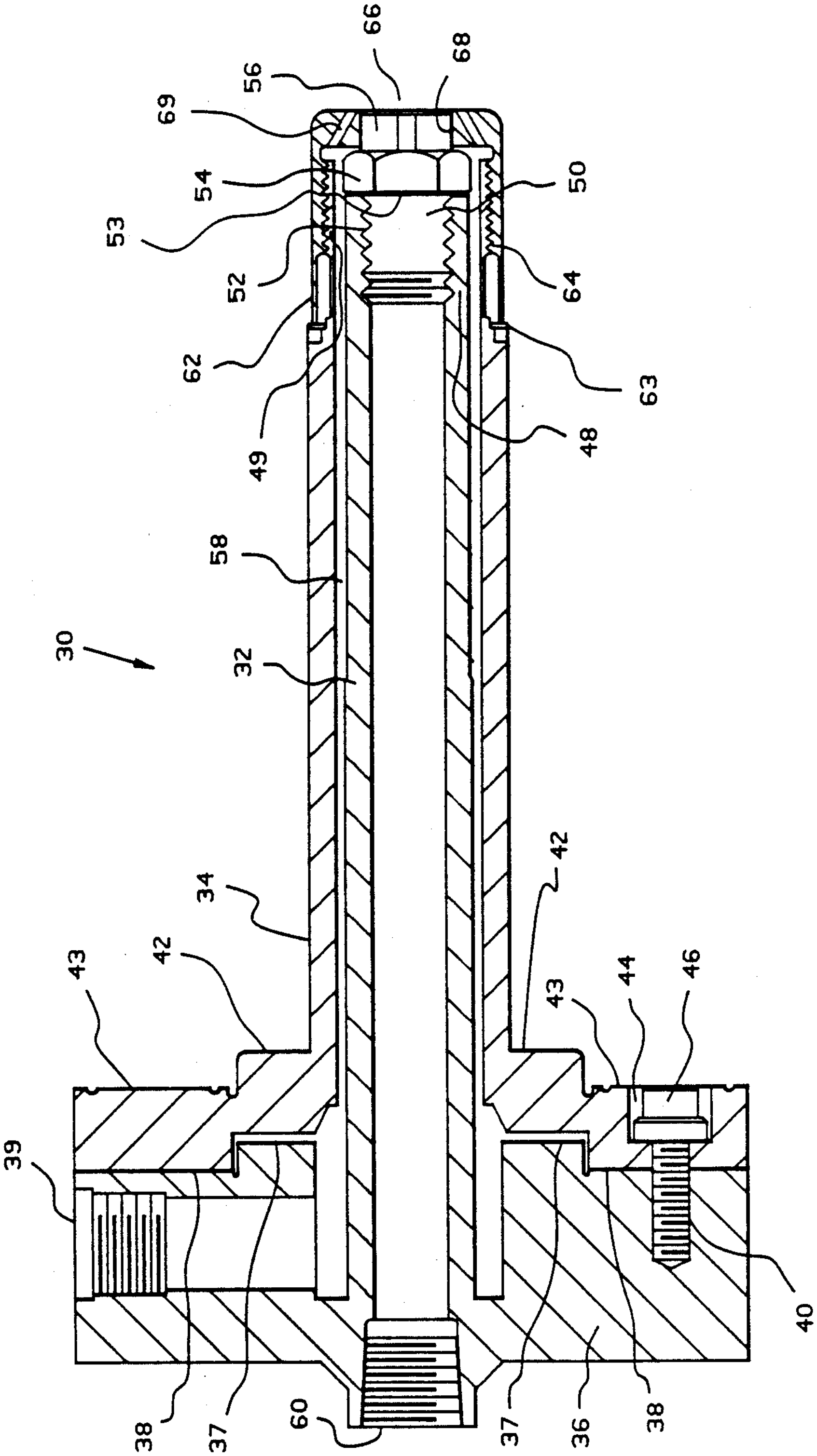
FIG. 2 is an axial cross-sectional view of the fuel nozzle assembly of the present invention.

Turning next to FIG. 2, the fuel nozzle assembly 30 of the present invention may be seen. The fuel nozzle assembly 30 includes an inner fuel delivery tube 32 and an outer air delivery tube 34 extending axially from a support flange 36 at one end. The air delivery tube 34 is concentric and substantially coextensive with the fuel delivery tube 32.

The support flange 36, which mounts the fuel delivery tube on the gas turbine engine, extends radially outwardly from the fuel delivery tube 32. The support flange 36 has upper and lower maximum axial extensions 37 adjacent the air delivery tube 34 and upper and lower reduced axial extensions 38 adjoining the maximum axial extensions 37. The lower reduced axial extension 38 of the support flange 36 is provided with a bolt receiving opening 40. The support flange 36 also includes a threaded, radially extending atomizing air inlet 39 for receipt of an air line.

The air delivery tube 34 also extends radially outwardly coextensive with the outwardly radial extension of support flange 36. The radial extension of the air delivery tube 34 includes upper and lower maximum axial extensions 42 adjoining the fuel delivery tube 32 and upper and lower reduced axial extensions 43 adjoining the upper and lower maximum axial extensions 42. Lower reduced axial extension 43 is provided with a bolt receiving opening 44.

The air delivery tube 34 extends axially with, and concentric to, the fuel delivery tube 32 to define the annular air passage 58 between the outer wall of fuel delivery tube 34 and the inner wall of air delivery tube 34 throughout their common axial extent. The end 49 of air delivery tube 34 has a reduced outer diameter threaded for receipt of an internally threaded swirl cap 62.

When securing of air delivery tube 34 to support flange 36 is desired, the lower reduced axial extensions 38, 43 of the support flange 36 and air delivery tube 34 respectively, are aligned. The alignment of the lower reduced axial extensions 38, 43 has the further advantage of properly aligning the fuel delivery tube 32 and the air delivery tube 34. Bolt 46 is then inserted through openings 40 and 44 and secured to support flange 36 to attach the air delivery tube 34 to support flange 36. When access to annular air passage 58 is desired for cleaning, bolt 46 is removed and the air delivery tube 34 detached from support flange 36 to expose the walls of the air and fuel delivery tubes which define air passage 58.

The fuel delivery tube 32 has an axial opening which is internally threaded at each end thereof. A fuel line (not shown) is normally received in the fuel inlet end 60. The delivery end 48 of the fuel delivery tube 32 terminates in a fuel nozzle tip 50 threaded onto the fuel delivery tube 32. The fuel nozzle tip 50 includes a threaded skirt portion 52 for attaching the fuel nozzle tip 50 to the delivery end 48, a hexagonal flange 54 and a cylindrical face 56 which engages engaging means 62 such as a swirl cap. A sealing washer 53 is interposed between the hexagonal flange 54 and the threaded skirt portion 52 to prevent oil leaking from the fuel delivery tube 32 and contaminating the annular air passage 58.

The swirl cap 62 includes an internally threaded skirt portion 64 and a centrally located opening 66 having a cylindrical surface 68. The swirl cap 62 further includes small apertures 69 equilangularly spaced around the center of the swirl cap 62 for directing atomizing air in a predetermined convergent direction to intercept and atomize the fuel exiting the fuel nozzle tip 50. The cylindrical surface 68 is sized to receive the cylindrical face 56 of nozzle tip 50 so that as swirl cap 62 is tightened onto air delivery tube 34, the nozzle tip 50 protects into the opening 66 to thus allow the cylindrical face 56 to engage the cylindrical surface 68. The swirl cap 62 is retained in this position by a locking ring 63 positioned between the skirt 52 and the adjoining portion of air delivery tube 34. During the tightening of swirl cap 62, the locking ring 63 is deformed such that it engages parts of the facing air delivery tube 37 and the skirt 52 so as to prevent relative rotation therebetween.

Figure 3B:
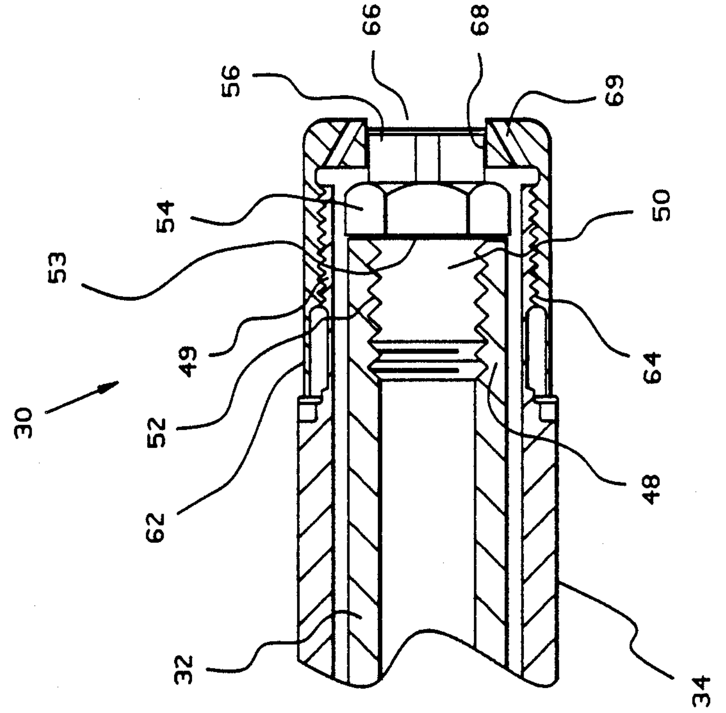
FIG. 3*b* is an axial cross-sectional view of the delivery end of the fuel nozzle assembly of FIG. 2 which has undergone axial expansion caused by severe high temperature operating conditions.
Figure 3A:
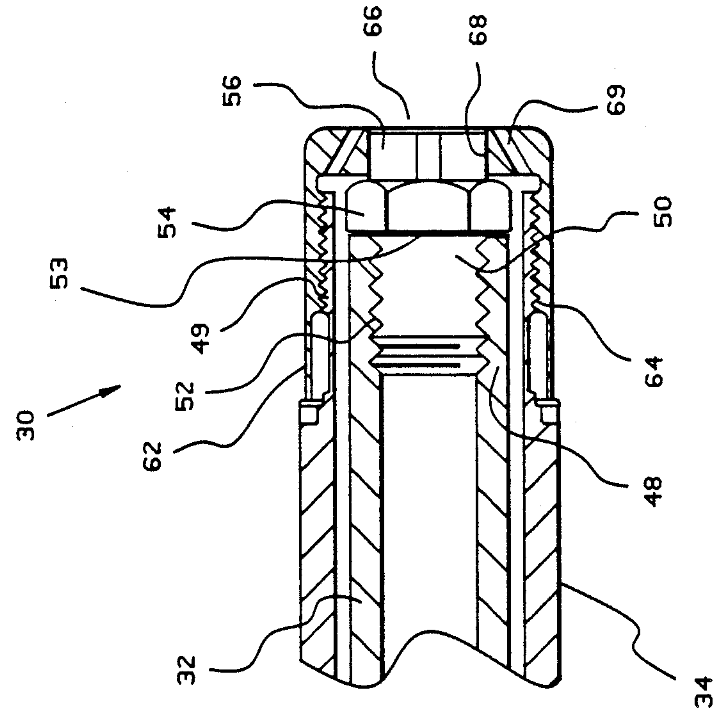
FIG. 3*a* is an axial cross-sectional view of the delivery end of the fuel nozzle assembly of FIG. 2 under normal operating conditions.

FIG. 3*a* shows the fuel nozzle assembly 30 of the present invention when subjected to normal temperature conditions, i.e. when there is no extreme temperature differential between the fuel flowing in the fuel delivery tube 32 and air delivery tube 34. As clearly shown in FIG. 3*a*, when there is no temperature differential between the tubes, the fuel and air delivery tubes are sealed at the cylindrical nozzle tip 56/cylindrical surface 68 interface. No gapping is present at the interface, and contamination of the air passage 58 is unlikely. The air atomization of the fuel spray generally results in the desired atomized nodular spray pattern.

Turning next to FIG. 3*b*, the fuel nozzle assembly of the present invention is shown when subject to axial expansion of the air delivery tube caused by the extreme thermal conditions during operation. The air delivery tube 34 expands axially to a greater extent than the fuel delivery tube 32. As the air delivery tube 34 expands, the cylindrical surface 68 of swirl cap 62 slides along the cylindrical face or surface 56 of fuel nozzle tip 50. Cylindrical face 56 is sized such that when air delivery tube 34 undergoes maximum axial expansion during the extreme operating conditions of the fuel nozzle assembly, the cylindrical surface 68 continues to engage cylindrical face 56. As the engagement of cylindrical surface 68 and cylindrical face 56 is maintained, the radial separation of the cylindrical surface 68 and the cylindrical face 56 remains constant and no gapping will occur. The complementary geometry of surface 68 and face 56 provides a constant radial interface with respect to the common axis of the fuel delivery tube and the air delivery tube, thus preventing radial separation between the two when they undergo relative axial movement. The axial lengths of surface 68 and face 56 are great enough to prevent any gap due to the relative axial movement.

We claim as our invention:

1. A fuel nozzle assembly for a gas turbine engine comprising:

a fuel delivery tube having a fuel nozzle at one end and fuel inlet means at the opposite end;

a support flange attached to said fuel delivery tube generally adjacent to said fuel inlet means;

an air delivery tube substantially enclosing said fuel delivery tube and extending axially from said support flange in spaced relation to said fuel delivery tube to define an annular air chamber between said tubes; and engaging means attached to said air delivery tube for engaging said fuel delivery tube, said engaging means having an interior opening for receiving said fuel nozzle;

said fuel nozzle and said engaging means having complementary geometry for maintaining a constant radial separation therebetween when said air delivery tube moves axially relative to said fuel delivery tube.

2. Fuel nozzle assembly of claim 1 wherein said engaging means further comprises a plurality of atomizing air passages in communication with said annular air chamber.

3. Fuel nozzle assembly of claim 1 wherein said engaging means is axially slidable with respect to said fuel nozzle.

4. Fuel nozzle assembly according to claim 1 wherein said engaging means comprises a swirl cap attached to said air delivery tube, said swirl cap terminating in an opening having an interior surface for engaging said fuel nozzle, said swirl cap further including a plurality of atomizing air passages in communication with said air chamber.

5. Fuel nozzle assembly according to claim 4 wherein said interior surface of said swirl cap is cylindrically shaped and sized to receive said fuel nozzle.

6. Fuel nozzle assembly according to claim 1 further comprising means for securing said air delivery tube in spaced relationship with said fuel delivery tube.

7. Fuel nozzle assembly according to claim 6 wherein said securing means further comprises means for removably attaching said air delivery tube to said support flange.

8. A fuel nozzle assembly for a gas turbine engine comprising:

a fuel delivery tube having a fuel nozzle at one end and fuel inlet means at the opposite end;

a support flange attached to said fuel delivery tube generally adjacent to said fuel inlet means;

an air delivery tube substantially enclosing said fuel delivery tube and extending axially from said support flange in spaced relation to said fuel delivery tube to define an annular air chamber between said tubes; and a swirl cap attached to said delivery tube, said swirl cap terminating in an opening having an interior surface for engaging said fuel nozzle, said swirl cap further including a plurality of atomizing air passages in communication with said air chamber;

said fuel nozzle and said swirl cap having complementary geometry to maintain a constant radial separation therebetween during axial expansion of said air delivery tube;

wherein said fuel nozzle has a cylindrically shaped outer surface and said interior surface of said swirl cap is cylindrically shaped and sized to receive said fuel nozzle.

9. In a fuel nozzle assembly in a gas turbine engine, said assembly having a fuel delivery tube having a first end, a fuel nozzle attached to said first end of the fuel delivery tube, an air delivery tube substantially enclosing said fuel delivery tube to define an annular air chamber between said tubes, and engaging means attached to said air delivery tube for engaging said fuel delivery tube, said engaging means having an interior opening for receiving said fuel nozzle, said interior opening defining an interior surface, the improvement comprising:

a fuel nozzle tip with a cylindrical surface attached to said fuel nozzle;

said interior surface of said engaging means cylindrically shaped and sized to receive said fuel nozzle;

said fuel nozzle tip received in said interior opening, said fuel nozzle tip surface and said interior surface defining a substantially constant radially separation;

wherein said substantially constant radial separation is maintained during axial expansion of said air delivery tube.

10. Fuel nozzle assembly of claim 9 wherein said engaging means is axially slidable with respect to said fuel nozzle tip.

11. Fuel nozzle assembly of claim 10 further comprising securing means for removably securing said air delivery tube and said fuel delivery tube in an aligned fit.

12. Fuel nozzle assembly of claim 11 wherein said fuel delivery tube is received by said securing means.

13. Fuel nozzle assembly of claim 12 wherein said air delivery tube and said securing means are radially coextensive.

14. Fuel nozzle assembly of claim 13 wherein said engaging means further comprises a plurality of atomizing air passages in communication with said annular air chamber.

15. A fuel nozzle assembly in a gas turbine, said assembly having a fuel delivery tube for delivering fuel from a delivery end, an air delivery tube substantially enclosing said fuel delivery tube to define an annular passage between said tube for delivering air, engaging means attached to said air delivery tube for engaging said fuel delivery tube at said delivery end, said engaging means and said delivery end defining a passage connected to said annular passage for passing delivered air to mix with said delivered fuel, said fuel delivery tube having a fuel nozzle tip with a predetermined outer surface at said delivery end, and said engaging means having an opening with an interior surface for tightly receiving said tip surface, characterized by said tip surface and said interior surface having complimentary cylindrical geometry with respect to the common axis of said fuel delivery tube and said air tube, whereby said tubes maintain a constant radial relationship when they undergo relative axial movement, thereby avoiding the generation of a gap therebetween.

16. In a gas turbine engine of the type having air supplied to a combustion chamber at a high temperature and fuel supplied to said combustion chamber at a relatively low temperature, a fuel nozzle assembly comprising a fuel delivery tube having a fuel nozzle at one end and fuel inlet means at the opposite end, a support flange attached to said fuel delivery tube generally adjacent to said fuel inlet means, an air delivery tube substantially enclosing said fuel delivery tube extending axially from said support flange in spaced relation to said fuel delivery tube to define an annular air chamber between said tubes, and engaging means attached to said air delivery tube for engaging said fuel delivery tube, said engaging means having an interior opening for receiving said fuel nozzle, said fuel nozzle and said engaging means having complementary geometry for maintaining a constant radial separation therebetween during relative expansion of said air delivery tube with respect to said fuel delivery tube.

* * * * *